UNITED STATES PATENT OFFICE.

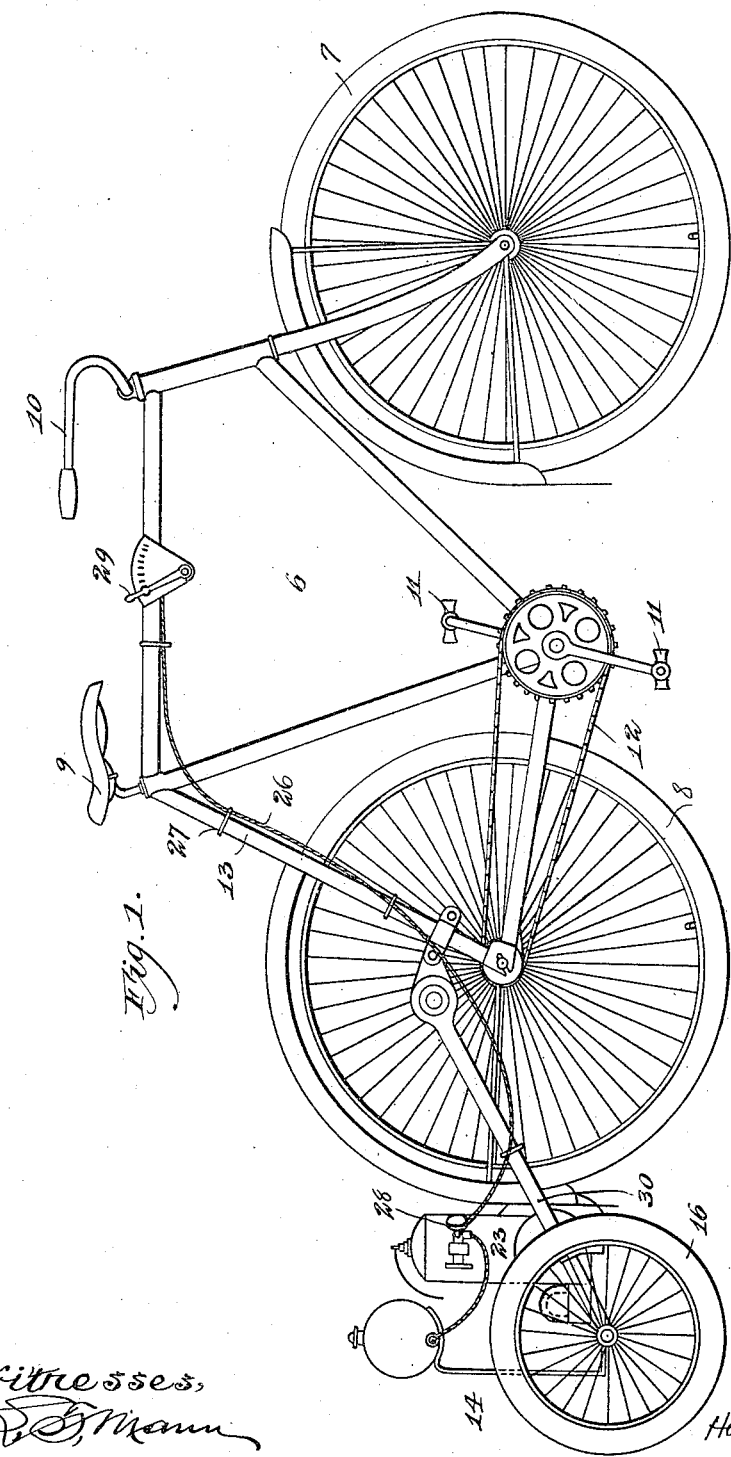

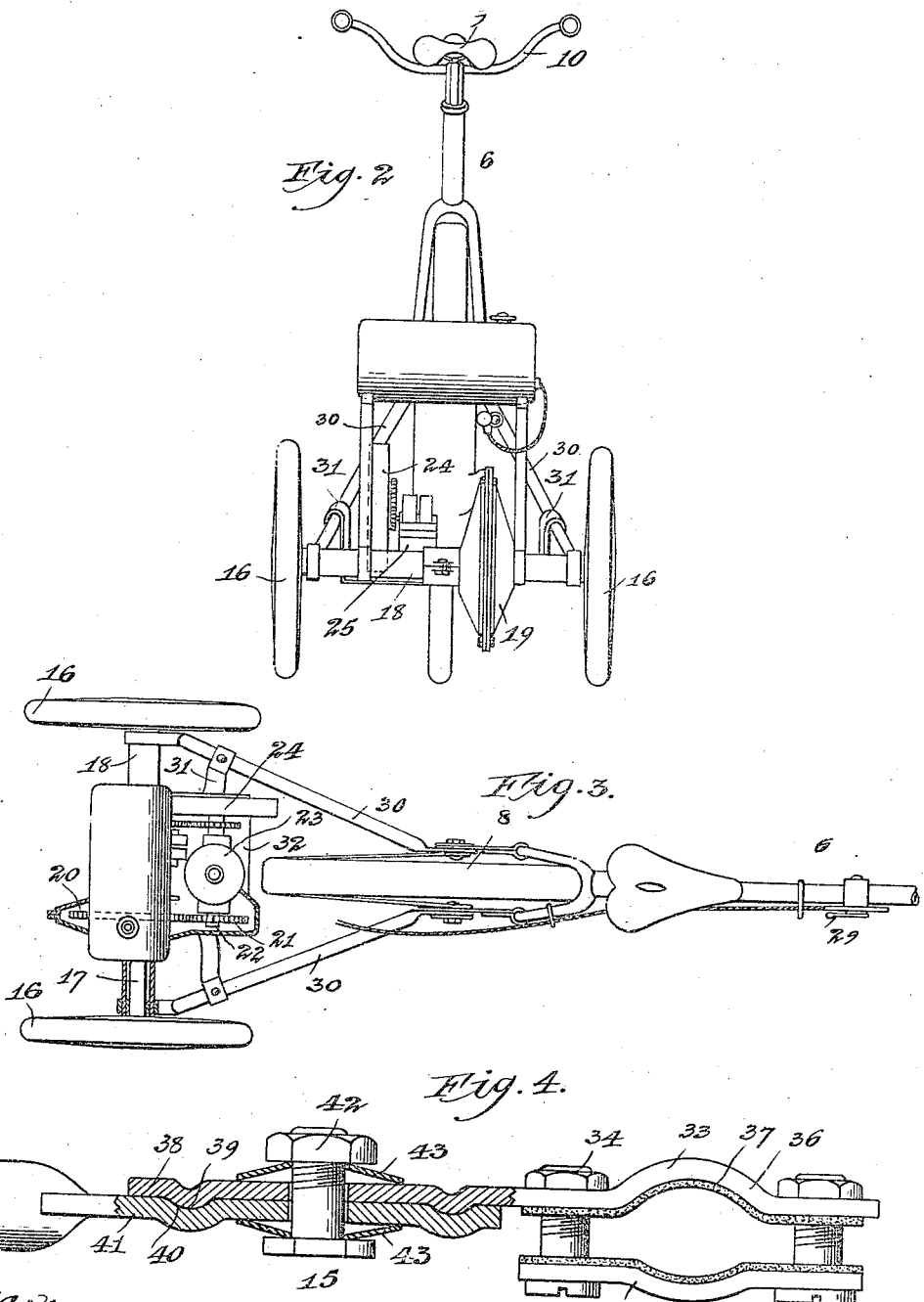

HENRY TIDEMAN, OF MENOMINEE, MICHIGAN.

MOTOR ATTACHMENT FOR BICYCLES.

1,165,467. Specification of Letters Patent. Patented Dec. 28, 1915.

Application filed August 17, 1914. Serial No. 857,121.

*To all whom it may concern:*

Be it known that I, HENRY TIDEMAN, a citizen of the United States, residing at Menominee, in the county of Menominee and State of Michigan, have invented certain new and useful Improvements in Motor Attachments for Bicycles, of which the following is a specification.

My invention relates to improvements in motor attachments for bicycles and refers more particularly to a type of motor attachment which may be applied to an ordinary safety bicycle, thereby converting the same into a motorcycle.

Among the salient objects of the invention are, to provide a motor attachment capable of being connected to an ordinary safety bicycle so that the latter may be pushed along from the rear by the said motor attachment; to provide an attachment of the class referred to which is capable of being applied to or detached from an ordinary safety bicycle without the necessity of employing special devices or appliances and with a minimum consumption of time and trouble; to provide a motor attachment of the class referred to which shall be capable of maintaining the bicycle in an upright position when the machine is standing; to provide a motor attachment of the type referred to which is of the required power to move the combined machine and its rider at the desired rate of speed while at the same time it is of minimum weight and size so as not to occupy a large amount of storage space or interfere with the rider's customary movements in mounting or dismounting from the machine; to provide a motor attachment of the type referred to which is so organized that while constructed in the proper manner to maintain the bicycle in an upright position, it does not materially interfere with the steering movements of the machine; to provide an attachment of the class referred to so organized as to maintain the bicycle in upright position while pushing the latter along, while at the same time provision is made for an articulated connection between the attachment and the bicycle so as to take care of inequalities of the road surface without straining the frame of the machine; to provide a motor attachment for bicycles of the class referred to which shall be simple and economical in construction and easy and convenient to maintain and keep in repair, and, in general, to provide an improved motor attachment for safety bicycles of the type referred to.

My invention consists in the matters hereinafter described and more particularly pointed out in the accompanying drawings, in which—

Figure 1 is a side elevation of my improved motor attachment applied to an ordinary safety bicycle; Fig. 2 is a rear end elevation of Fig. 1; Fig. 3 is a plan view of the combined machine shown in Fig. 1, the front portion thereof being cut away to reduce the size of the figure; and Fig. 4 is a plan view, partly in section, of the articulated joint connection between the motor attachment and the frame of the bicycle.

Referring to the drawings, 6 represents as a whole an ordinary safety bicycle to which my device is applied, this bicycle having the usual front and rear wheels 7 and 8, saddle 9, handle bars 10 and pedals 11 which drive the rear wheel by means of a pair of sprockets and chain 12. It is understood that the hub of the rear wheel 8 of the bicycle must be equipped with a coaster brake and clutch so that it is unnecessary to operate the pedals and cranks of the bicycle while the machine is being propelled under the influence of the motor of the attachment. The frame of the bicycle is of the customary diamond type, the rear fork including a pair of stays 13 to which the motor attachment, designated as a whole 14, is connected through the medium of the articulated joint connections designated as a whole 15. As manifest from a glance at Figs. 2 and 3, the motor attachment includes a pair of pneumatic tire wheels 16 which are spaced apart the required distance to maintain the equilibrium of the combined machine, and are connected together through the medium of a drive shaft 17 running in bearings in the cross-frame 18 of the motor attachment. The cross-frame 18 includes a housing 19 large enough to protect a large gear 20 keyed to the said shaft 17, and driven by the small pinion 21 secured to the projecting end of the crank-shaft 22 of the motor 23. The motor 23 is preferably of the gasolene type and is equipped with the customary flywheel 24, ignition being effected by the magneto 25. The motor is controlled from the seat of the motor bicycle through the medium of a Bowden control wire 26 which is suitably supported on the frame of the machine by clips 27 and operates upon the throttle 28 when the hand-lever 29 is manipulated. It is of course readily understood that other means of control, such as the spark advance, the valve-lifter, clutch, etc., may be applied and operated in a similar manner, but in order to simplify the description I have shown only one control wire,—that leading to the throttle.

Describing now the manner in which the attachment is connected to the rear stays 13 of the safety bicycle, 30 represents a pair of side bars which, at their trailer or motor ends, are rigidly secured to the ends of the cross-frame 18 and are also tied together by means of a pair of bent up strap members 31 which also form supporting brackets for the platform 32 which supports the motor. The side bars 30 converge at their upper front ends where they form articulated joint connections 15 with the clamps 33. Each of the clamps 33 includes a pair of bolts 34 and an adjustable member 35 shaped to correspond with the curvature of the back stays 13, and a relatively fixed clamping member 36 similarly curved to fit the back stays, which are thus clamped between the said members 35 and 36 by means of bolts 34 passing through them. In order to prevent marring of the finished surface of the back stays 13 I face the inner surfaces of the clamps 33 and 35 with a pair of leather strips 37. The rear end of each of the clamping members 33 is extended, as shown in Fig. 1, and forms a circular bearing disk 38 which is suitably pressed out or stamped so as to provide an annular bead or ridge 39 which is adapted to fit within a corresponding annular groove 40 formed in a similar disk-like bearing member 41 carried by and formed integral with the upper end of each of the side bars 30 of the trailer frame. The two members 38 and 41 are each of them centrally perforated, as shown in Fig. 4, and held together by a bolt 42 which passes through the said perforations. The bolt 42 is a comparatively loose fit in the perforations of the bearing disks 38 and 41 and holds the latter in intimate contact through the medium of a pair of spring washers 43 interposed between the heads of the bolt and the outer sides of the bearing disks 38 and 41.

It is manifest that the shape and fit of the ridges 39 in the grooves 40 may be such as to prevent relative endwise movement of the bars 30 with respect to the clamping members 33, while at the same time mutual rotation of the said members is permitted, thus enabling the side bars 30 to push the bicycle along the ground under the influence of the motor on the trailer, while at the same time the trailer or the bicycle wheels are permitted to rise and fall, due to any inequalities of the roadway. The spring washers 43 are inserted for the purpose of permitting a slight springing apart at their edges of the members 38 and 41 so as to compensate for the relative angular displacements of the trailer frame with respect to the frame of the bicycle, due to steering movements of the front wheel, or torsional movements of the respective frames.

It is apparent that in order to convert the combined machine into an ordinary bicycle, or vice versa, all that is necessary is to insert or remove the bolts 42 of the articulated joint connections 15 and also to disconnect the control wires. The design of the trailer or motor attachment is such that its weight is reduced to a minimum and it occupies a very small amount of space in the rear of the vehicle and does not interfere with the natural movements of the rider in mounting or dismounting from his machine. When the trailer is attached to the safety bicycle the latter is thereby held in upright position and maintained in equilibrium so that it is unnecessary for the rider to concern himself in preserving his balance either while stationary or while the machine is moving.

While I have illustrated in the drawings and described in the specification what I consider to be a preferred embodiment of my invention, yet it is obvious that my construction is capable of various modifications without departing from the spirit of the invention, and, therefore, I do not wish to be limited in the use of my device, except as specified in the appended claims.

I claim—

1. The combination of a safety bicycle, a trailer therefor having two wheels with their axes coincident and behind the axis of the rear wheel of said bicycle, said wheels being spaced apart on either side of a line drawn in the direction of travel of the bicycle through the center of said rear wheel, a motor adapted to drive said trailer, and a pivotal joint connection interposed between said trailer and bicycle.

2. The combination of a safety bicycle, a trailer therefor having two wheels on a common axis, the projection of said axis being resiliently maintained parallel with the projected axis of the rear wheel of said bicycle while being permitted to oscillate vertically with respect to said wheel, and a motor carried by and adapted to drive said trailer.

3. The combination of a safety bicycle, a trailer therefor having two wheels spaced apart on either side of the center line of said safety bicycle on a common axis at right-angles to the direction of travel of said bicycle and located at the rear of the axis of the rear wheel of said bicycle, the projection of said common axis being resiliently maintained parallel with the projected axis of the rear wheel of said bicycle, said trailer being permitted to oscillate vertically with respect to said wheel, and a motor adapted to drive said trailer and push said bicycle.

4. The combination of a safety bicycle, a two-wheeled motor-driven trailer therefor, said wheels being located in different vertical planes and rigidly maintained with their axes parallel, and an articulated joint connection interposed between said safety bicycle and said trailer adapted to permit free relative vertical displacements of the trailer with respect to said safety bicycle and adapted to permit a limited amount of horizontal displacement of said trailer and said safety bicycle.

5. The combination of a safety bicycle, a two-wheel motor-driven trailer therefor the wheels thereof having a common axis at the rear of the circumference of the rear wheel of said bicycle and spaced apart on either side of the plane of said rear wheel, said trailer having a rigid frame adapted to maintain its two wheels in their respective parallel vertical planes, an articulated joint connection interposed between said safety bicycle and said trailer frame adapted to permit mutual vertical displacements of the trailer with respect to said safety bicycle, and resilient means associated with said joint connection and adapted to permit a limited amount of horizontal angular displacement of said trailer and said safety bicycle.

HENRY TIDEMAN.

Witnesses:
L. C. JACKMAN,
T. M. WOOD.

Copies of this patent may be obtained for five cents each, by addressing the "Commissioner of Patents, Washington, D. C."